US011099257B2

(12) United States Patent
Meier et al.

(10) Patent No.: US 11,099,257 B2
(45) Date of Patent: Aug. 24, 2021

(54) RADAR SYSTEM HAVING A CLEARING DEVICE

(71) Applicant: Geopraevent AG, Zurich (CH)

(72) Inventors: Lorenz Meier, Zurich (CH); Dominik Jäger, Zurich (CH); Bernhard Lüthi, Zurich (CH)

(73) Assignee: GEOPRAEVENT AG, Zurich (CH)

( * ) Notice: Subject to any disclaimer, the term of this patent is extended or adjusted under 35 U.S.C. 154(b) by 90 days.

(21) Appl. No.: 16/497,551

(22) PCT Filed: Mar. 22, 2018

(86) PCT No.: PCT/EP2018/057324
§ 371 (c)(1),
(2) Date: Sep. 25, 2019

(87) PCT Pub. No.: WO2018/177887
PCT Pub. Date: Oct. 4, 2018

(65) Prior Publication Data
US 2020/0200868 A1  Jun. 25, 2020

(30) Foreign Application Priority Data
Mar. 30, 2017 (DE) .......................... 102017106851.1

(51) Int. Cl.
*G01S 7/40* (2006.01)
*G01S 13/04* (2006.01)
(Continued)

(52) U.S. Cl.
CPC ................ *G01S 7/40* (2013.01); *G01S 13/04* (2013.01); *H01Q 1/02* (2013.01);
(Continued)

(58) Field of Classification Search
CPC .. H01Q 1/02; G01S 7/40; G01S 13/04; G01S 2007/4043; G01S 2007/4039
(Continued)

(56) References Cited

U.S. PATENT DOCUMENTS 6,067,673 A  *  5/2000  Paese ...................... E03C 1/057
                                                  4/313
6,414,623 B1 *  7/2002  Ashihara ............... G01S 7/4004
                                                  342/70
(Continued)

FOREIGN PATENT DOCUMENTS

DE        19850639 A1    5/1999
EP         2000826 A1   12/2008
(Continued)

OTHER PUBLICATIONS

Meier, Lorenz, et al., "Radar-based Warning and Alarm Systems for Alpine Mass Movements", Interpraevent 2016—Conference Proceedings, pp. 960-968.

*Primary Examiner* — Hai V Tran
(74) *Attorney, Agent, or Firm* — Murphy, Bilak & Homiller, PLLC (57) ABSTRACT

A radar system for sensing object movements in a predefined target region is described. The radar system includes: at least one radar unit which includes at least one transmitting unit designed to emit electromagnetic radiation and at least one receiving unit designed to receive reflected electromagnetic radiation; at least one evaluating unit designed to sense object movements in the predefined target region and, for a sensed object movement, to decide whether the object movement is a sought object movement; at least one covering device behind which the transmitting and receiving units are arranged for protection; and at least one clearing device designed to remove deposits that adhere to or lie on an outer surface of the at least one covering device. The (Continued)

evaluating unit is designed to determine whether deposits are present on the outer surface or not and to decide whether the clearing device becomes activated or not.

17 Claims, 7 Drawing Sheets

(51) Int. Cl.
    *H01Q 1/02*     (2006.01)
    *H01Q 1/42*     (2006.01)

(52) U.S. Cl.
    CPC ............. *G01S 2007/4039* (2013.01); *G01S 2007/4043* (2013.01); *H01Q 1/42* (2013.01)

(58) Field of Classification Search
    USPC .......................................................... 343/704
    See application file for complete search history.

(56) References Cited

U.S. PATENT DOCUMENTS

| | | | | |
|---|---|---|---|---|
| 6,819,283 | B2* | 11/2004 | Okai | G01S 13/931 342/70 |
| 6,954,172 | B2* | 10/2005 | Hofmann | G01S 7/4004 342/165 |
| 2006/0152705 | A1* | 7/2006 | Yoshida | G01S 17/931 356/5.01 |
| 2015/0094908 | A1* | 4/2015 | Hirota | B60S 1/0833 701/36 |
| 2016/0176384 | A1* | 6/2016 | Dissette | G01S 13/931 134/34 |

FOREIGN PATENT DOCUMENTS

| | | |
|---|---|---|
| JP | H10329653 A | 12/1998 |
| JP | H11211821 A | 8/1999 |

* cited by examiner

RADAR SYSTEM HAVING A CLEARING DEVICE

The invention relates to a radar system for sensing object movements in a predefined target area, in particular, for sensing individual objects, accumulations of objects, earth movements, snow movements and the like, comprising at least one radar unit, which comprises at least one transmitting unit, in particular, transmitting antenna, which is designed to emit electromagnetic radiation, and which comprises at least one receiving unit, in particular, receiving antenna, which is designed to receive reflected electromagnetic radiation, comprising at least one evaluating unit, which is designed, on the basis of the radiation emitted and received and on the basis of associated time measurements, to sense object movements in the predefined target area and to decide for a sensed object movement whether it is a sought-after object movement, and comprising at least one covering device, wherein the transmitting unit and the receiving unit are, related to a main radiation direction of the transmitting unit directed toward the target area, arranged behind the covering device or are each arranged behind a respective or associated covering device, in order to protect the transmitting unit and the receiving unit, and wherein at least one clearing device is provided on the radar unit, which is designed to remove deposits, in particular, water, snow and the like, which adhere to or lie on an outer surface of the at least one covering device.

Such a radar system can be used in many ways, for example, for the detection of persons, vehicles and/or airplanes or of groups of such individual objects, but also for the detection of so-called mass movements, such as earth masses (landslide, debris flow), rock masses (falling rock), snow masses (avalanche) and the like.

For such a radar system, the problem regularly exists that the detection or recognition of a desired object movement becomes falsified or impossible if deposits or buildups, in particular, in the form of water drops, snow or ice, form on a cover for the transmitting unit and the receiving unit or a cover of the radar unit, which can also be designated as a radome.

From JPH11211821 (A) it is known to use a wiper for a radar, which is operated dependent on a temperature measured, where the wiper is used especially for cold temperatures and for the possible formation of snow.

The object of the invention is to provide a radar system where the reliability of detected object movements is improved, in particular, error sources due to effects of the weather and deposits on the antenna or radar cover can be excluded.

To solve this object, it is suggested that the evaluating unit is designed, on the basis of electromagnetic radiation received, to determine whether deposits are present on the outer surface or not and to decide whether the clearing device becomes activated or not.

Since electromagnetic radiation is emitted by the radar unit, in particular, its transmitting unit, the received, in particular, reflected radiation, can be directly used to obtain information in relation to movable or static adhesions or deposits on the cover of the radar unit. Thus, a clearing device can be operated independently of a measured temperature value. Accordingly, it is, for example, possible to detect and, where required, remove deposits of water drops if the ambient temperature is significantly higher than 0° C. Furthermore, also the presence of additional deposits, such as wet dirt, excrements of birds and the like, can be detected with such a system.

In order to be able to better or even completely protect the transmitting unit and the receiving unit towards the environment, it is proposed that the transmitting unit and the receiving unit are arranged within a radar housing, with the radar housing including at least a basis and the covering device. The basis and the covering device are, in particular, detachably connected to one another, for example, by a positive form locking connection, such as a clip or snap-on connection, or by at least a screw connection or the like.

With regard to the transmitting unit and the receiving unit, it is pointed out that these can, in particular, be configured as a transmitting antenna or receiving antenna. Preferably, they are realized as so-called patch antennas. Furthermore, it is pointed out that the transmitting unit and the receiving unit can be both separate (electronic) components and can be integrated, as a transmitting/receiving unit, in a common (electronic) component.

The evaluating unit can be designed to determine an amplitude of reflected electromagnetic radiation and/or determine a difference of reflected electromagnetic radiation, which has been received by various receiving units. Hence, adhesions or deposits can, by using reflected radiation, be detected in a desired manner, which, dependent on the type of radar unit, in particular, with a plurality of transmitting/receiving units, can be adapted in such a manner that reliable results can be provided.

It is further suggested that the clearing device is configured as a blower device, which is designed to generate a fluid flow along the outer surface of the covering device, in order to remove adhering or adjacent water drops or snow accumulation. Due to a fluid flow, in particular, an airflow, along the outer surface, on one hand, adhering water drops or snowflakes or accumulation of snow can be carried away from the outer surface and, on the other hand, pushing away of precipitation can be achieved in the case of permanent operation of the blower, before the precipitation reaches the outer surface. Another advantage of a blower device is that the fluid flow (airflow), contrary to a wiper, does not have an effect on the transmission and reception of electromagnetic radiation. In other words, a fluid flow does not falsify the electromagnetic radiation, whereas a wiper is an obstacle for the transmission and reception of electromagnetic radiation. Furthermore, there is no mechanical contact with the fluid flow, whereby the risk of damage to the covering device or radome is reduced.

The blower device can be arranged in the area of a first edge of the covering device, and a main flow direction of the fluid flow can be directed towards a second edge area, with the second edge area lying opposite to the first edge area. In this process, the radar unit can, in an assembled state, be aligned in such a manner that the first edge area is located higher than the second edge area. The radar unit and thus also the covering device are generally, related to a horizontal or vertical, aligned in an inclined manner, with the inclination being dependent on where the radar unit is installed, how large the target region to be monitored is, and what difference in height exists between the site of installation and the target region.

Alternatively, the clearing device can be configured as a wiping device, which includes at least one wiper arm movable relative to the housing, which is designed to be moved to and fro along the other surface of the covering device and in contact with the outer surface. In this process, based on electromagnetic radiation received, it is also to be determined whether deposits are present on the outer surface or not, and decided whether the wiping device becomes activated or not.

The wiping device can include at least one driving device, which is coupled to the at least one wiper arm.

To this end, it is further proposed that the wiper arm is movable, in particular, linearly slidable, from a first edge area of the covering device to a second edge area of the covering device, with the first edge area and the second edge area being arranged opposite to one another. Such a wiper arm, for example, can be movable from an upper edge section of the covering device to a lower edge section of the covering device, so that adhesions or deposits can be removed in a wiping movement from top to bottom.

Alternatively, the wiper arm can be movable, in particular, pivotable, from a first edge area of the covering device to a third edge area of the covering device, with the first edge area and the third edge area being arranged in an inclined manner to one another, in particular, being arranged substantially orthogonal to one another. Such a wiper arm can, for example, be movable or pivotable from a top edge section to a lateral edge section, so that an area, which approximately has the form of a quarter circle, is wiped by the wiper arm.

Furthermore, it can be considered to provide at least one nozzle on the radar unit, through which a de-icing agent can be applied to the covering device. Such a nozzle can, for example, be mounted on a wiper arm. However, the mounting of such a nozzle for de-icing agents in combination with a blower is also conceivable. In this process, the airflow can, in particular, also be used to distribute de-icing agents along the outer surface of the covering device.

The blower device and the radar unit can be arranged on a common flow component, which includes at least one suction opening through which ambient air enters the flow component and which is configured in such a manner that sucked in ambient air, after redirection by the blower device, exits as a fluid flow along the outer surface of the covering device. The flow component can also be designated as a common total housing for the radar unit and the blower device.

In this respect, the flow component can, related to the radar unit mounted on a front side of the flow component, have a lower suction opening and/or a rear suction opening. In this respect, the suction opening or suction openings are arranged in such a manner that the suction of or adhesion of precipitation, such as snowflakes, is preferable avoided. If a lower suction opening and a rear suction opening are provided, it can be ensured that, independent of the prevailing weather conditions, such as swirling snow, one of the suction openings generally remains free. A protective device, for example, in the form of a perforated sheet or the like, can be provided on the suction opening. Furthermore, a filter device, which is connected to the protective device in the flow direction, can be provided on the suction opening.

The flow component can generally form a self contained flow path from the suction opening to the blower device. In this respect, sucked in air flows, from bottom to top, behind the radar unit to the blower device, with the sucked in air being redirected by the blower device to the front and bottom and exiting as a fluid flow along the front side of the radar unit again.

The suction opening can be sized in such a manner that the speed of sucked in ambient air is as low as possible, in particular, only is small enough that precipitation present in the ambient air, such as raindrops or snowflakes, cannot be carried away in the direction of the suction opening.

Furthermore, the flow component can be configured in such a manner that it is pivotably mountable or mounted on a support device. In this respect, the flow component can be pivotable together with the radar unit and the blower device. A preferably settable pivot angle is within a range of 0° to 50°.

Furthermore, at an upper section of the flow component, a protective element with a protective nose protruding beyond the radar unit, in particular, its outer surface, can be mounted.

The outer surface of the covering device can also further include a hydrophobic coating. By means of such a coating, the adhesion of precipitation, in particular, in the form of water or snow, can be reduced. Furthermore, in combination with the clearing device, improved removal of adhesions or accumulations can be achieved.

Furthermore, the radar unit can include at least one heating device, which is designed to generate, in the area of the radar unit, a radar temperature, which is above the prevailing ambient temperature, in particular, to generate a radar temperature, which is higher than 0° Celsius. In particular, it is considered that the covering device has a temperature of more than 0° C., so that adhesion or deposit of snow at ambient temperatures of less than 0° C. ambient temperature, is reduced. Furthermore, removal of adhesions or deposits along the heated covering device is also facilitated by means of the blower or of the wiping device.

In this connection, it is also conceivable that a heated fluid flow, which flows along the outer surface of the covering device, is generated by the blower device.

In addition, a heating device has the additional advantage that the electronic components accommodated within the housing of the radar unit can be maintained at a desired operating temperature, in particular, if the ambient temperature is less than 0° C.

It is further suggested that the radar system includes at least one temperature measuring unit, which is designed to determine the ambient temperature, with the radar system being designed to switch on or switch off the heating device dependent on an ambient temperature measured.

In addition to measuring the ambient temperature, the temperature within the housing of the radar unit or on the outer surface of the covering device can also be measured by means of an additional temperature sensor. In such a case, it is possible that the heating device can, dependent on the ambient temperatures or internal temperatures (within the housing) measured, be controlled to enable an optimum operating temperature for the radar unit.

The radar system can further include at least one image taking device, which is designed to take an image of at least one portion of the outer surface and transmit the image to the evaluating unit. In such a case, the evaluating unit can be designed to automatically evaluate an image taken and to determine whether deposits are present on the outer surface or not, and to decide whether the clearing device becomes activated or not. In this process, the provision of an image taking device is an advantageous addition, which enables checking of the condition of the outer surface of the radar unit by an operator at a remote computer, where such a check can be performed independently of the function of the radar unit, for example, if the radar unit does not operate correctly.

A thermal imaging camera can also be used as the image taking device. Compared to the radar unit, cooler precipitation, such as adhering snowflakes or raindrops, can be reliably detected by means of a thermal imaging camera as, by means of the thermal imaging camera, an image of the temperature distribution is generated. Such a temperature distribution image can generally be evaluated automatically even better than a customary image from the radar unit.

The image taking device can be mounted on an interior side of the protective element, in particular, of the protective nose, facing the radar unit. In this process, the image taking device can, for example, be configured as a ceiling camera accommodated within a hemisphere-like housing, where the inner side of the protective nose can serve as a "ceiling" for mounting the image taking device. By mounting the image taking device on the protective element, the image taking device can be arranged near to the radar unit and is largely protected from effects of the weather. To further improve the protection, the protective element can have inclined side protection sections.

Furthermore, the image taking device can be pivotable together with the flow component. By mounting the radar unit, the blower device and, optionally, the image taking device on the flow component with the optional protective element, these components can remain relatively fixed to one another regardless at which pivot angle the flow component is aligned relative to a superordinate support structure. The radar unit and the blower device can, together with the flow component, where required, also with the optional protective element, form a type of module, which can be readily assembled at a site of manufacture before an outdoor installation.

For the radar system, the evaluating unit can be connected to a central unit via a network, wherein the central unit is designed such that information from the radar unit, in particular, regarding detected movements, mass movements, temperature, presence of deposits and the like, can be provided to an operator. The central unit can be a computer server. Various input/output devices, such as display and keyboard, mobile computer (laptop, tablet, smartphone) can be connected to this server, on which an operator is provided with representations of information based on the data of the radar system or of the radar unit.

The invention is described in more detail in the following text, with reference to the accompanying figures.

Figure 1:
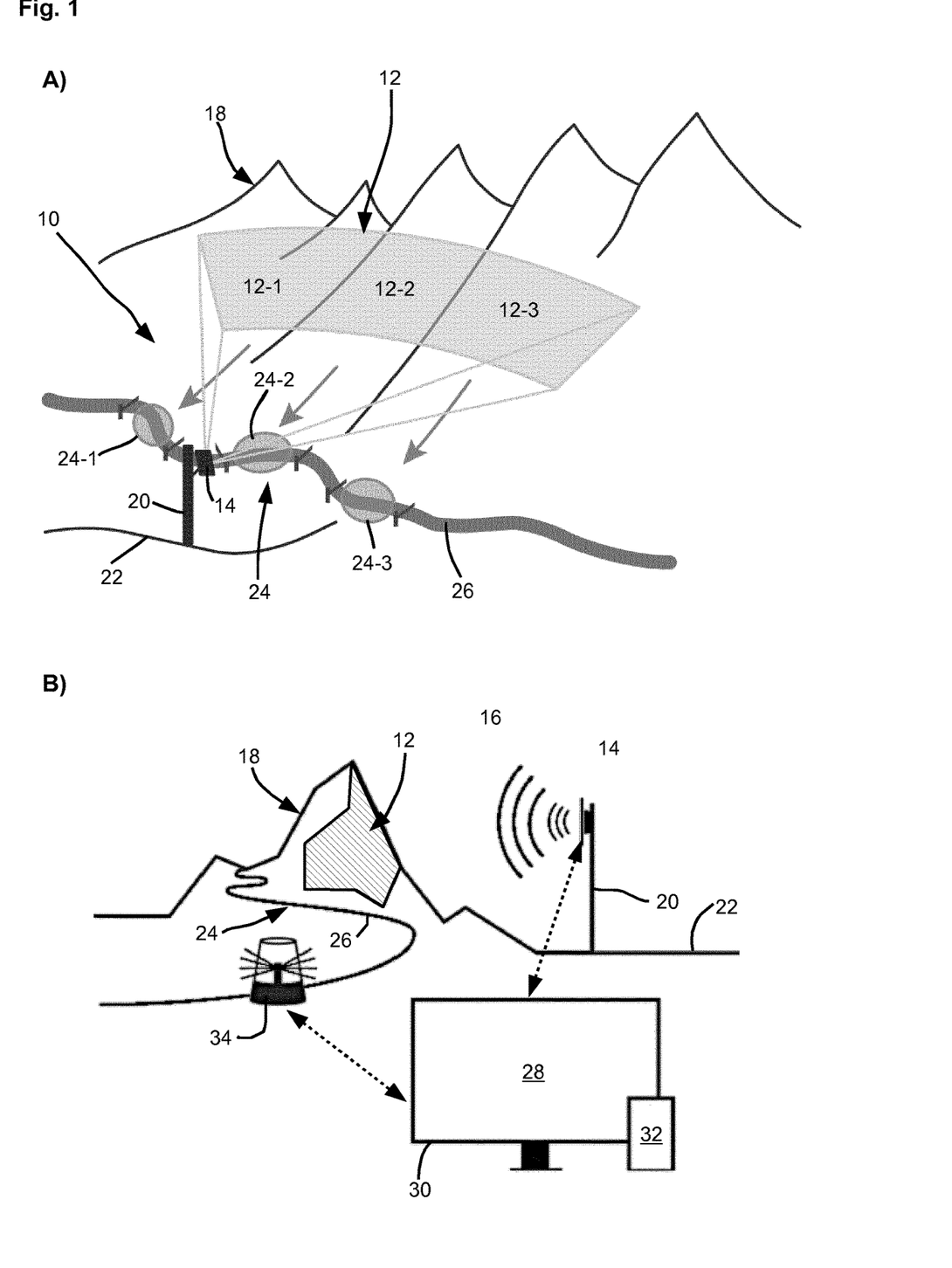
FIG. 1 shows, in the partial figures a) and b), a radar system and its function purely schematically and in a simplified manner.

FIGS. 1a) and 1b) show, in a simplified and schematic manner, a radar system 10, which is designed to sense object movements in a target region 12. The radar system 10 comprises at least one radar unit 14. The radar unit 14 transmits and receives electromagnetic radiation 16 (radar waves) to scan the target region 12 with regard to object movements. Usually, the target region has an area which can be up to several square kilometers. Currently, for example, target region areas of approximately 0.1 km$^2$ to approximately 10 km$^2$ are customary. In this process, it must be observed that also greater target regions can indeed be monitored by the use of a plurality of radar units. Referring to FIG. 1a), the target region 12 can be divided into a plurality of target regions 12-1, 12-2, 12-3 of interest. Such partial regions 12-1, 12-2, 12-3 can, for example, be areas of a hillside in mountainous surroundings 18, where mass movements can be expected, such as avalanches, debris flows, rock falls or the like.

Usually, the radar unit 14 is fastened to a superordinate structure 20, such as a pylon, a framework, a building or the like. This structure 20 is generally firmly anchored in the underground 22. Usually, the radar unit 14 is installed at a certain distance from the target region 12. In the present example, the target region 12 is located above a region 24 to be protected. The region 24 to be protected can, for example, be a settlement, a road 26, a railroad, a ski slope or the like.

The radar unit 14 comprises at least one transmitting unit (transmitting antenna) and at least one receiving unit (receiving antenna) to transmit and receive electromagnetic radiation (radar waves) 16. The data or radar signals sensed with regard to the target region 12 can, in particular, be transmitted to a central computer 28, which is illustrated by a display 30 in FIG. 1b), by means of an evaluating unit provided in the vicinity of the radar unit or integrated in the radar unit. The data sensed by the radar unit and, in particular, transmitted by the evaluating unit can be processed by the central unit 28 and provided to interested operators in a processed form. This data can also be transmitted to mobile terminals 32, such as a tablet computer, notebook, smartphone, by the central computer 28. It is also conceivable that the evaluating unit is designed in such a manner that it can directly communicate with a mobile terminal, in order to transmit information.

If it is determined via the evaluation of the data sensed by the radar unit 14 that there is an object movement in the target region 12, e.g., that an avalanche is unleashed in the target region 12, an alarm can be triggered by the central computer, which is illustrated by the blinking light 34 in FIG. 1b). Additionally to the alarming of persons and/or public bodies (authorities), for example, by a text message to a mobile phone or the like, further measures, such as road blockages by signaling equipment 36, such as traffic lights, barriers or the like, can be automatically triggered. In this process, the radar system is designed in such a manner that, for example, it can determine for a target region 12 of FIG. 1a), whether the object movement has been detected in one or more of the partial regions 12-1, 12-2, 12-3, so that an alarm can be output for correspondingly affected areas 24-1, 24-2, 24-3, and the corresponding partial areas 24-1, 24-2, 24-3 can be secured.

The radar unit 14 is generally exposed to very changeable weather conditions, in particular, it is exposed to precipitation, such as rain and snow, and to large fluctuations in temperature. Furthermore, the radar unit 14 is usually installed in a region that is at a lower altitude above sea level than the target region 12 to be observed. Accordingly, the radar unit 14 is generally mounted on the structure 20 in an inclined manner. A vertical alignment of the radar unit 14 shown in FIG. 1b) is rather unusual and is due to the schematic method of representation in FIG. 1b). In this process, the radar unit 14 forms, in particular, with an outer surface, a kind of inclined plane in space. Deposits and adhesions of water, snow, ice and other particles can form on this outer surface or inclined plane, whereby the electromagnetic radiation during transmission/reception is affected.

Figure 2:
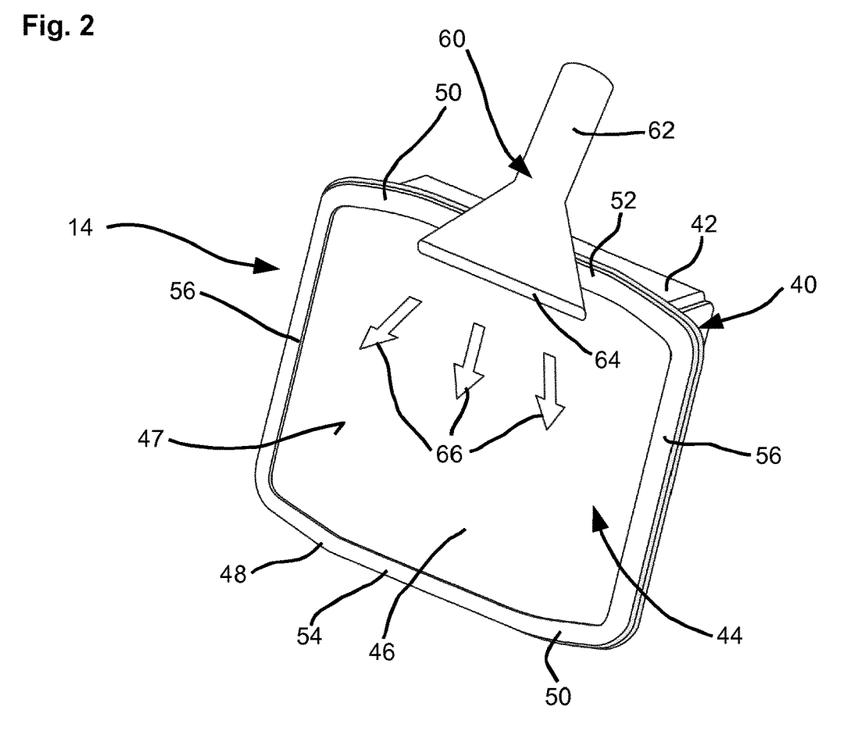
FIG. 2 shows a first embodiment of a radar unit comprising a blower device.

FIG. 2 shows a radar unit 14 in a simplified and schematic manner. The radar unit 14 includes a radar housing 40. The housing 40 comprises a basis 42 and a covering device 44, which are, in particular, detachably connected to one another. Within the basis 42, which can also be designated as a receptacle or box, at least one transmitting unit (transmitting antenna) and at least one receiving unit (receiving antenna) for electromagnetic radiation are accommodated, which cannot been seen in the representation selected. The transmitting unit and the receiving unit serve to emit radar waves and receive reflected radar waves again, in order to be able to detect information regarding object movements in the target region therefrom. It is clear that further components of the radar unit can be additionally accommodated within the basis 42, such as an evaluating unit or control device, internal power source, or connection for an external power source, such as a battery, solar panel or the like. It is also conceivable that only the antennas for transmission/reception are arranged behind a covering device 44 or within a radar housing 40. In such a case, the antennas (transmitting unit and receiving unit) can be connected, via corresponding connections (wire), to a remote evaluating unit or control unit, power source or the like. These, for example, can be accommodated within a separate computer housing, which is installed remote from the radar unit with the antennas. In this process, the distance between the antennas and the remaining components can generally be approximately 0.1 meter to approximately 15 meters.

The covering device 44 comprises a plate 46, which can be substantially configured flat or, related to the external side, can be realized convex. In the illustrated example, the plate 46 is bordered by a frame 48. The covering device 44 has the base area of a polygon. Preferably, it is realized substantially rectangular. Due to four slightly chamfered or inclined edge sections 50, the base area in the illustrated example can also be designated as octagonal. However, the covering device can also have other forms, in particular, it is conceivable that it is configured circular or elliptical, or that it is limited by a mixed form of straight and inclined or bent edges. For example, the concept of the clearing device presented in the text below can also be implemented for a horn antenna or a patch antenna.

The covering device 44 comprises an upper edge section 52 and a lower edge section 54, which lie opposite to one another. The upper edge section 52 and the lower edge section 54 are connected to one another by lateral edge sections 56. The use of the terms "top" and "bottom" relates, in particular, to a mounted alignment of the radar unit with a structure 20 (FIG. 1). In this process, the upper edge section 52 is generally located higher than the lower edge section 54, with the flat or concave plate 46 being aligned inclined or oblique in space to the horizontal or vertical.

In addition, the aforedescribed structure of the radar unit 14 substantially also applies to the additional FIGS. 2 to 6, in which identical reference numerals are used for identical elements, however, without explaining these elements in detail again.

In order to prevent or reduce deposits or adhesions of precipitation, in particular, of water drops, snowflakes, ice crystals, other particles or the like, the radar unit 14 comprises a blower device 60, which is illustrated here in a simplified and schematic manner, as the clearing device. The blower device 60 comprises a fluid supply line 62 and a nozzle 64, in order to output a fluid flow 66 along the covering device 44, in particular, along the plate 46 or the outer surface 47. The blower device 60 is arranged in the area of the upper edge section 52, so that the accelerated air 66 substantially flows from the upper edge section 52 to the lower edge section 54. Due to the arrangement of the blower device 60 in the area of the upper edge section 52, the displacement of adhering water or snow can be further supported due to the effect of gravity.

It is clear that the blower device 60 is suitably connected to the housing 20 of the radar unit, even if this is not illustrated here in detail for reasons of clarity. The blower device 60 further comprises a drive, which is not visible here, in order to drive a type of propeller or impeller, so that the desired fluid flow 66 can be generated. In particular, also so-called radial fans or radial blowers can be used. Usually, the generated fluid flow 66 is an airflow, in particular, an airflow generated by sucking in ambient air. Usually in this process, the sucked in ambient air passes at least one filter device, so that damage to the propeller or impeller, for example, by water or dirt particles, can be avoided.

Figure 3:
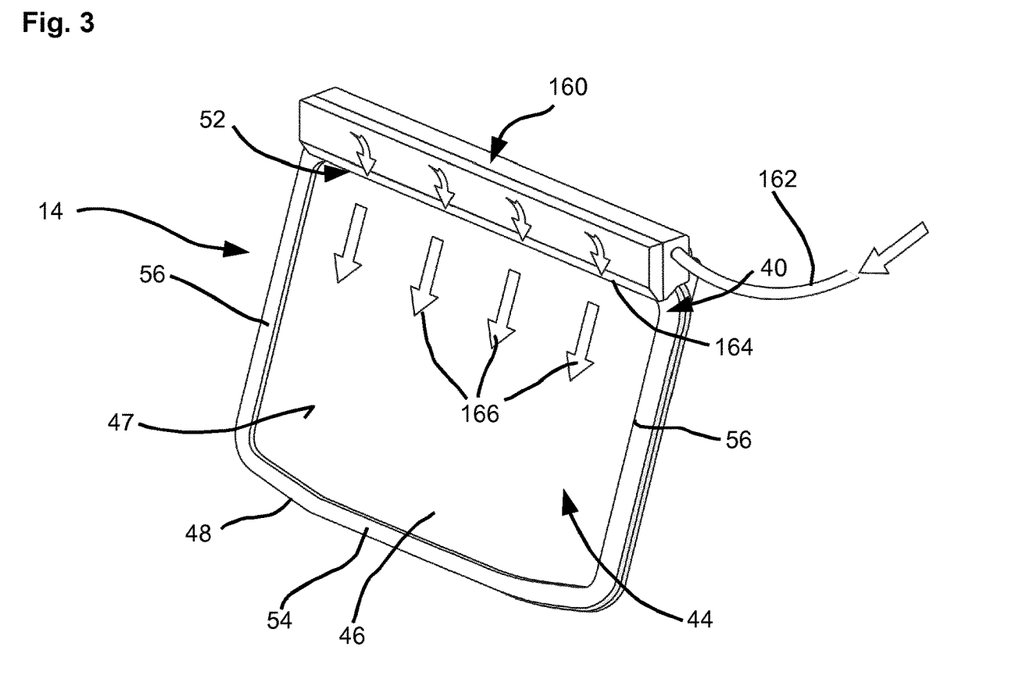
FIG. 3 shows a radar unit comprising another blower device.

FIG. 3 shows another embodiment of a blower device 160 for a radar unit 14. This blower device also comprises a fluid supply line 162 and a nozzle 164. In this example, the nozzle 164 is realized as a very narrow slit, so that an airflow 166 can be generated, which can be generated at high speed along the plate 46. In particular, the nozzle 164 is designed in such a manner that the airflow 166 acts as an air blade. In order to achieve sufficient acceleration of the air for this purpose, it can, in particular, be considered to use a compressor for the air supply. Also in this embodiment, the air 166 substantially flows from the upper edge area 52 to the lower edge area 54 of the covering device 42, in particular, of the plate 46 or of the outer surface 47.

Figure 4:
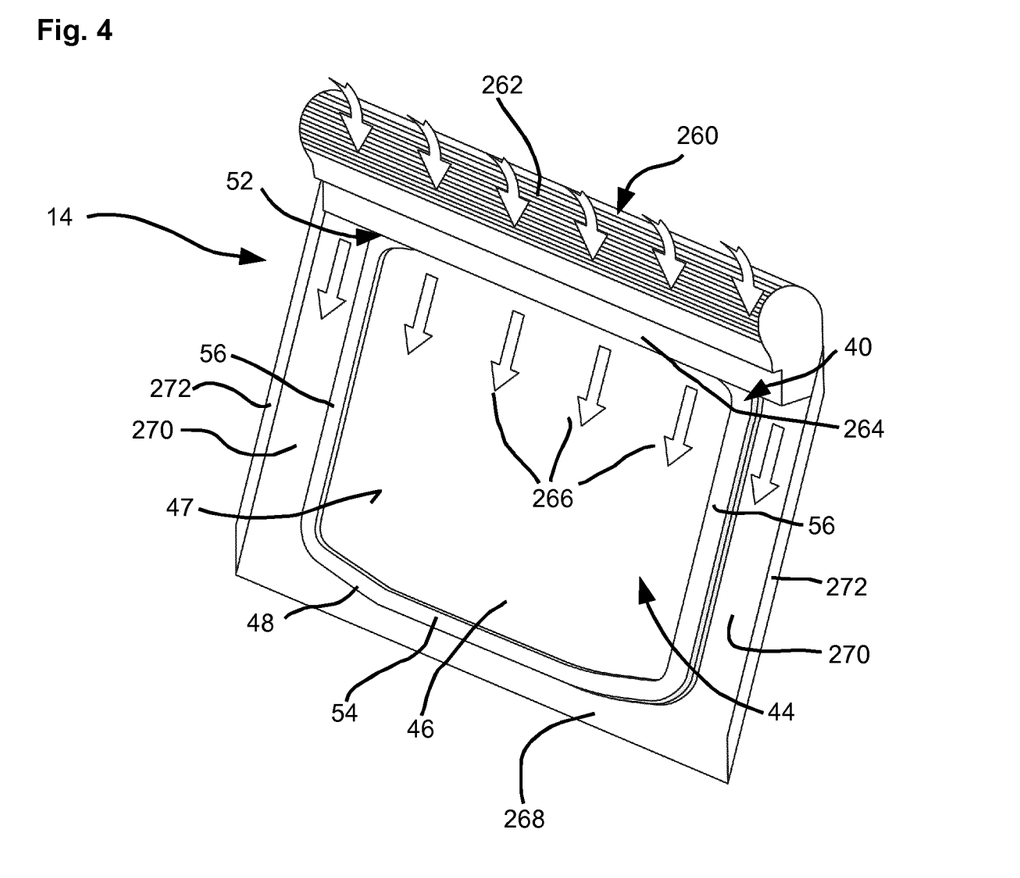
FIG. 4 shows a radar unit comprising yet another blower device.

FIG. 4 shows another embodiment of a blower device 260. In this blower device, fluid, in particular, air, is supplied through slit-like fluid supply openings 262. The air sucked in in the area of these fluid supply openings 262 is output again by means of an internal propeller arrangement in the area of a nozzle 264, so that an accelerated fluid flow 266 is emitted. In order to be able to guide or direct the fluid or airflow 266 more effectively, a guidance element 268 is arranged around the covering device 42. In this process, the guidance element 268 is guided along the lateral edge sections 56 of the covering device 42 and forms an airflow duct 270 there. In this process, the airflow duct 270 is, in particular, formed by the lateral edge sections 56 and particular guidance walls 272 of the guidance element 268. Since, due to the blower device 260, an airflow is generated beyond the entire width of the covering device 42, namely also in the air guidance ducts 270, the effect of the airflow 266 in the lateral edge sections 56 is improved. In particular, outflowing air 266 cannot easily escape in the lateral direction, so that all in all the efficiency of the airflow 266 is improved.

It must be remarked for all blower devices 60, 160, 260 that they are connected to a power source and that they can be switched on and off by a control unit not illustrated here. This task can be taken over by a control unit of the radar unit 14. In the radar unit 14, the blower devices 60, 160, 260 are switched on or off due to electromagnetic radiation received, through which it is determined whether deposits are present on the outer surface 47 or the plate 46 or not. Thus, the blower device 60, 160, 260 can be switched on and off independently of the ambient temperature and by evaluating data, which are generated anyway by the radar unit 14 in the course of scanning the target region 12 (FIG. 1).

Figure 5:
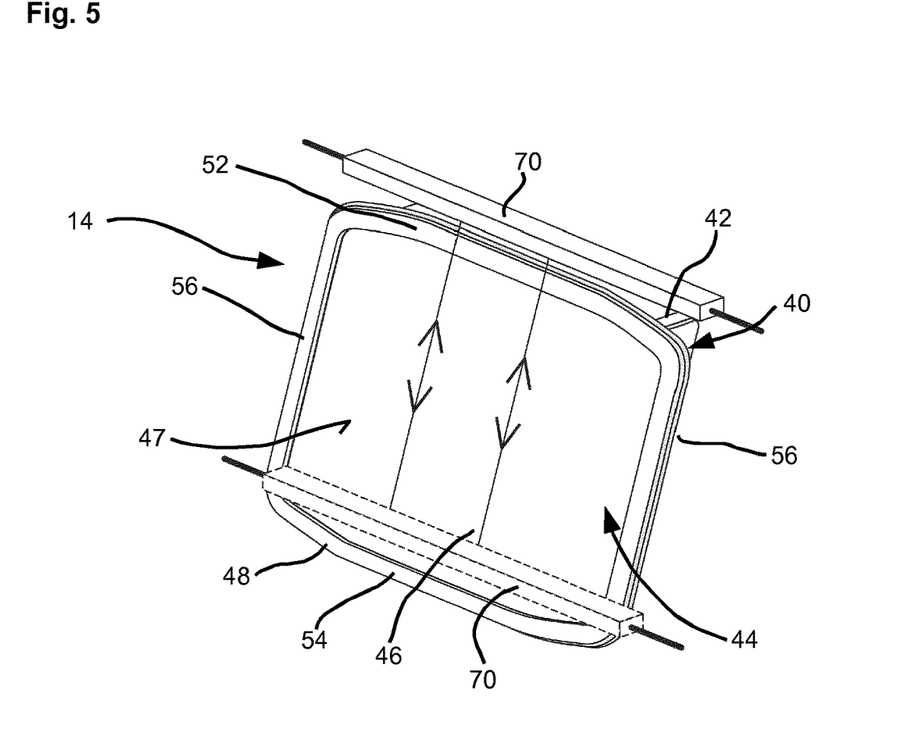
FIG. 5 shows a radar unit comprising a wiping device.
Figure 6:
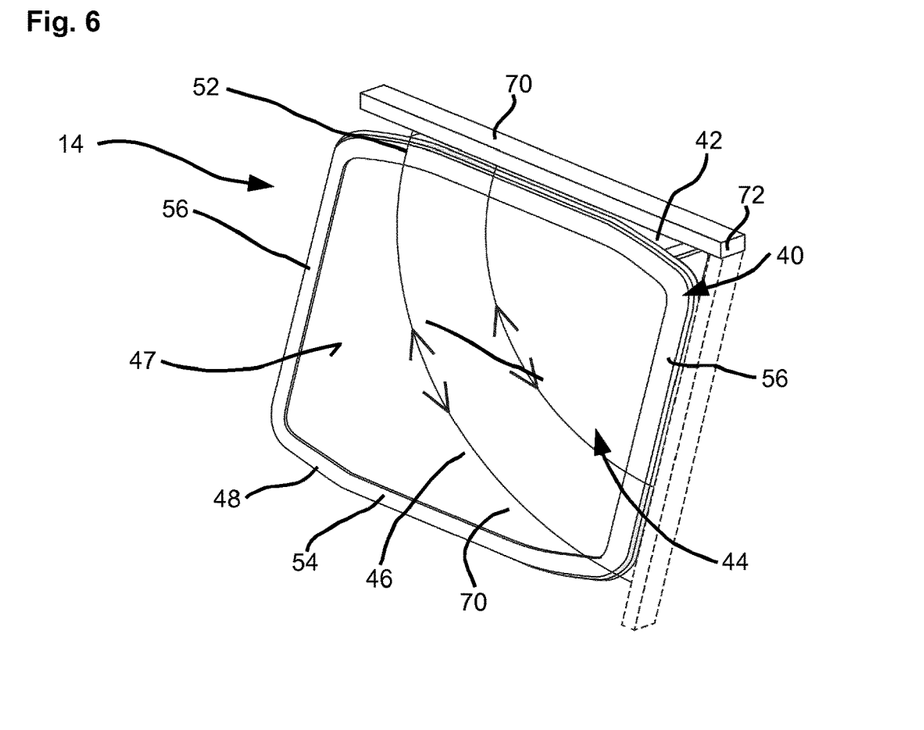
FIG. 6 shows a radar unit comprising another wiping device.

FIGS. 5 and 6 illustrate alternative clearing devices in the form of a wiper device 70, which is illustrated therein only schematically in the form of a bar, for the radar unit 14. In the example of FIG. 5, the wiper device 70 is movable to and fro from the upper edge section 52 of the covering device 42 to the lower edge section 54 relative to the plate 46 or the outer surface 47. In the example of FIG. 6, the wiper device 70 is pivotable around a center of rotation 72, so that the wiper device 70 is movable between the upper edge section 52 and the right-hand side lateral edge section 56. Naturally, the center of rotation 72 can also be arranged in such a manner that the wiper device 70 can be moved to the left-hand side lateral edge section 56.

It is clear that the wiper device 70 includes a type of wiper blade made from an elastic material, which abuts on the plate 47 [sic!] or the outer surface 47, so that adhering water drops or snowflakes can be removed mechanically. Similar to the blower devices 60, 160, 260, switching on or off the wiper device 70 is decided based on electromagnetic radiation received, through which it is determined whether deposits are present on the outer surface 47 or the plate 46 or not.

Figure 7:
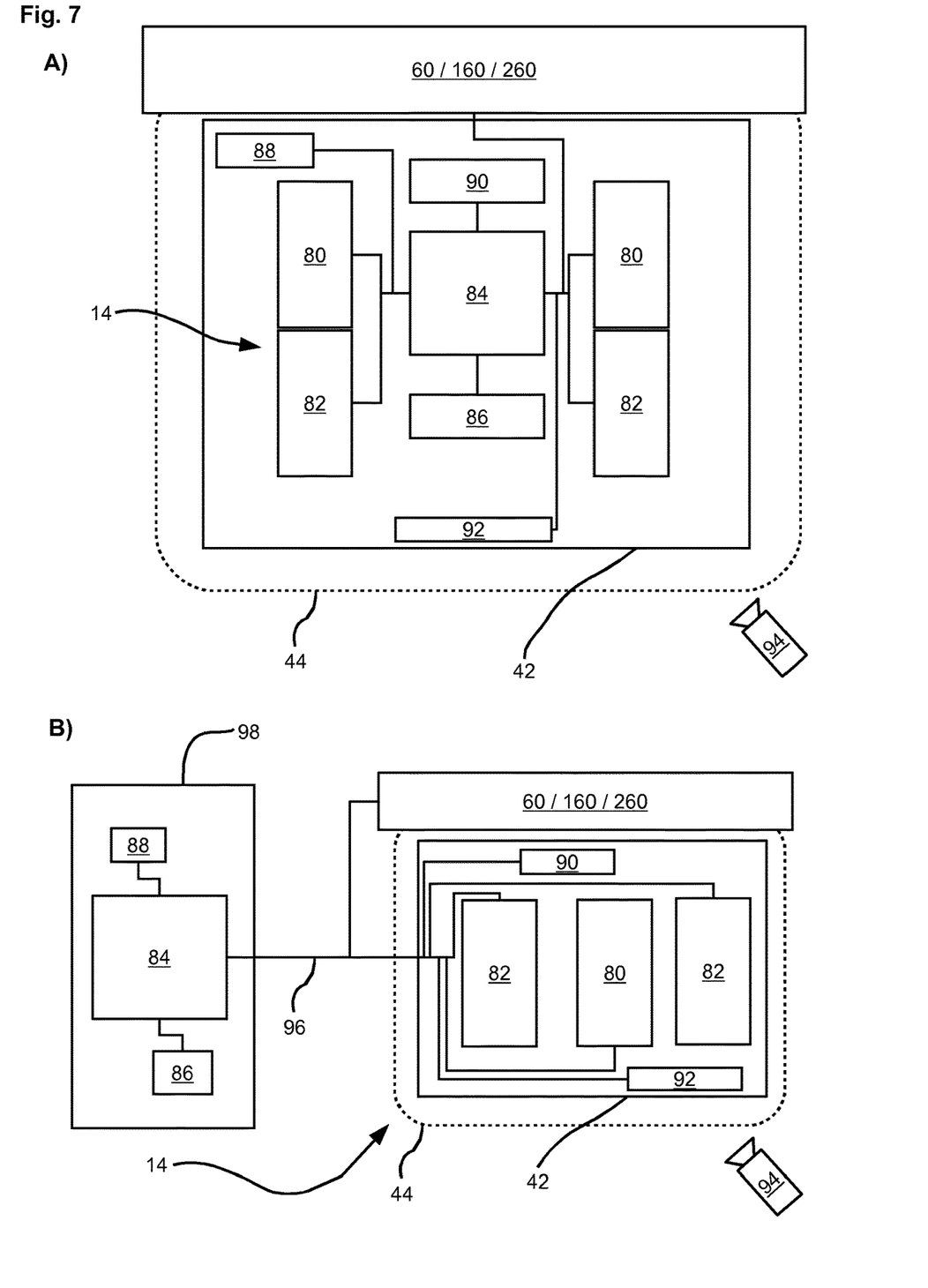
FIG. 7 shows, in each of the partial figures A) and B), a principle diagram of a radar unit.

In partial figures A) and B), FIG. 7 shows purely schematically, by way of example and non-restrictively, the structure of radar units 14 in a particular diagram. In the example of FIG. 7A), the components illustrated are incorporated within the basis 42 of the housing illustrated rectangular therein. The covering device 44 is indicated as a rounded dashed rectangle. For example, the radar unit 14 comprises two transmitting units 80 and two receiving units 82, which are designed to emit radar waves and receive reflected radar waves. Furthermore, the radar unit 14 comprises a control unit 84 (evaluating unit), which is designed to control the transmitting units 80 and the receiving units 82. Furthermore, the control unit 84 can be designed to evaluate data or signals received or make them available, via a communication interface 86, to a remote computer unit, for example, central computer 30 (FIG. 1) for the purpose of evaluation. The communication interface 86 enables, in particular, wireless data transmission. The radar unit 14 further comprises an energy supply 88, which, for example, can be realized as a battery, or which can be configured as a connection to an external energy source, such as a solar panel, a fuel cell or an electric power supply. Optionally, a temperature sensor 90 can be provided within the radar unit 14, which is designed to sense a temperature in the area of the radar unit 14. In this process, the temperature can be a temperature within the housing and/or an ambient temperature. Furthermore, a heating device 92 can be optionally allocated to the radar unit 14, which is designed to heat the radar unit 14, in particular, the covering device 44, in order to particularly prevent adhesion of snow and ice. A heating device 92 can, for example, be incorporated within the housing or the basis 42, or it can be provided within the covering device 44 itself.

From the representation of FIG. 7B) it can be seen that a transmitting unit 80 and two receiving units 82 are covered by the covering device 44. In such a case, the covering device 44 can, together with the basis 42, also be designated as an antenna housing. The transmitting unit 80 and the receiving unit 82 are connected to the evaluating device or control unit 84 via a connection 96. The control unit 84 is here incorporated with other components within a housing 98 of its own. This enables the installation of the control unit 84 remote from the radar unit 14.

As already explained, FIG. 7 only shows principally possible structure variants of a radar unit 14, without this structure imperatively needing to have all components mentioned. The number of transmitting units 80 and receiving units 82 can also be less or greater than two. In a preferred embodiment, a transmitting unit (transmitting antenna) comprising a plurality of receiving units (receiving antennas), in particular, with two receiving units, is provided as indicated by FIG. 7B), where this combination of transmitting and receiving units 80, 82 can also include additional components within a common housing as this has been illustrated in FIG. 7A). Which components are accommodated within the housing formed here by the basis 42 and covering device 44 is optional and can be determined based on the configuration of the radar system.

Finally, it is pointed out that in the radar system 10, at least one image taking device 94 not illustrated in detail can be provided, which is designed to take an image of at least one portion of the external surface 47 or of the plate 46 of the radar unit 14 and transmit the image to the control unit 84. Also a thermal imaging camera can be used as the image taking device 94, in order to be able to sense and evaluate an image of the temperature distribution prevailing at the radar unit.

The radar system presented here is, in particular, designed to be used under various weather conditions, with the clearing device, in particular, in the form of a blower or a wiper, being switched on or off dependent on reflected radar radiation.

Figure 8:
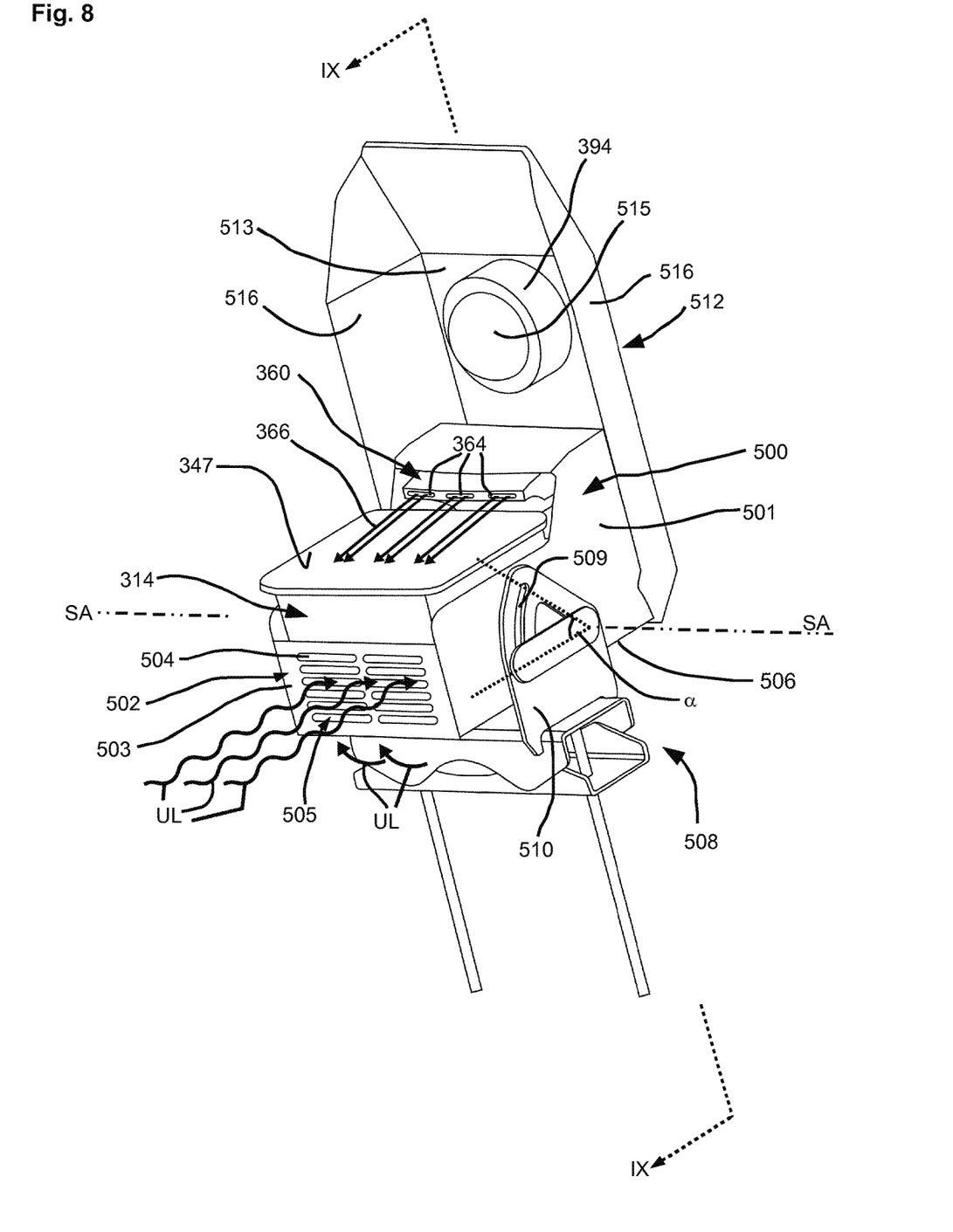
FIG. 8 shows, in a simplified and schematic perspective view, a radar unit comprising a blower device and a flow component.

Referring to FIG. 8 (schematic perspective view) and FIG. 9 (sectional view) at the same time, a radar unit 314 is described in the text below, which is arranged or incorporated within a flow component 500. Furthermore, a blower device 360 is arranged within the flow component 500. The blower 360 comprises a plurality of—here, for example, three—nozzles 364, through which a fluid flow 366 is generated along an outer surface 347 of the radar unit 314. The flow component 500 comprises two side walls 501, of which only one can be seen in the representation of FIG. 8. A protective element 503 is provided on a lower side 502 located between the two side walls 501. The protective element 503 can, for example, be a sheet metal-like component with a plurality of elongated hole-like openings 504. The protective element 503 covers a lower suction opening 505, through which the ambient air UL can be sucked in from below. A non-illustrated filter device can be arranged on the protective element 503. For example, the protective element 503 can include a mat made from porous material, which retains precipitation, such as snowflakes or raindrops, but allows ambient air UL to pass practically unhindered.

Alternatively, or in addition to the lower suction opening 505, a rear suction opening 507 can be provided on a rear side 506 of the flow component 500, through which the ambient air UL can be sucked in from behind. Ambient air UL sucked in through a suction opening 505, 507 flows within the flow component 500 towards the blower device 360, in particular, the ambient air UL is carried to the top. The blower device 360 comprises a drive unit 365, in particular, an electric motor, on a section facing away from the nozzles 364. The drive unit 365 sets a non-visible rotor inside the blower device 360 in motion, so that ascending ambient air UL enters the blower device 360 through an intake socket 367. The ambient air UL sucked in is accelerated within the blower device 360 and exits it again as a directed fluid flow 366 through the nozzles 364. Due to the waste heat generated during the operation of the drive device 365, the ambient air UL carried through the blower device 360 can be heated, so that a heated fluid flow 366 exits through the nozzles 364. Alternatively, or in addition, the blower device 364 can also include an additional device to heat the ambient air UL.

The flow component 500 can, related to an assigned support structure 508, be fastened pivotably to the support structure 508. In particular, the flow component 500 is rotatable or pivotable around a pivot axis SA. The pivot position of the flow component 500 is selectable and fixable in any position. The pivot angle α can be set from 0° to 50°.

The flow component 500 is guided along various positions by means of a sliding block guide 509 provided on both sides, which is provided in a plate-like section 510 of the support structure. The flow component 500 can be fixed to the support structure 508, in particular, in the laterally provided plate-like sections 510, by means of screw-nut connections, which are not explicitly illustrated here. Fixing at a desired angle α can also be done by means of predefined notches, which, for example, are formed along the sliding block guide 509, in combination with a spring-biased notch device. Since the radar unit 314 and the blower device 360 are mounted on the flow component 500, these components can be jointly pivoted around the pivot axis SA, without their relative position to one another changing. It is therefore not required to realign the radar unit 314 and the blower device 360 to one another if the pivot angle α is changed.

An optional protective element 512 can be arranged on an upper side 511 (illustrated as a dashed line in FIG. 9) of the flow component 500. The protective element 512 has a protective nose 513 protruding beyond the outer surface 347 of the radar unit 314. The protective nose 513 forms a kind of projecting canopy of the flow component 500. Optionally, an image sensing device 394 can be mounted on the inner side 514 of the protective nose 513. The image sensing device 394 can also be realized as a thermal imaging camera. The image sensing device 394 displayed here by way of example is a kind of ceiling camera with a hemisphere-like housing 515. The image sensing device 394 is designed to pick up images or thermal images from the radar unit 314, in particular, from the outer surface 347. For example, adhesions, such as dry snow, on the outer surface 347 can thereby be identified already at an early point in time, even if these adhesions may not have had yet an effect or not have had a large effect on the electromagnetic radiation measured. The protective element 512, where required, with the image taking device 394 mounted thereon, can also be moved or pivoted around the pivot axis SA together with the flow component 500. The protective element 512 further has lateral protection sections 516. In this process, the protection sections 516 are realized inclined in such a manner that they [sic!]. Furthermore, the protection sections 516 are sized in such a manner that the image taking device 394 is laterally protected by the protection sections, for example, from precipitation, but also from incident light.

The flow component 500 presented here can be used with each of the blower devices 60, 160, 260 presented above. In this respect, the example of FIGS. 8 and 9 is not restricted to the blower device 360 shown therein. Furthermore, the protective element 512 and, where required, the image taking device 394 incorporated within it can be combined with other embodiments of the radar system presented above, in particular, also with a wiper as the clearing device. Accordingly, the use of a protective element 512 is not restricted to the example of FIGS. 8 and 9.

If a clearing device other than a blower is used, the flow component 500 can also be used as a support for the radar unit and, for example, a wiper device, where required, with structural and size-related adjustments on the flow component 500, which then rather has the function of a module housing.

Furthermore, it is pointed out that all that has been explained with reference to FIGS. 1 to 7, such as the embodiment of the radar unit 14 shown therein or the basic system setup etc. can be combined with features shown with regard to FIGS. 8 and 9. For example, a radar unit 14 illustrated in FIG. 1 or 2, can be a radar unit 314 of FIGS. 8 and 9, which is arranged within a flow component 500.

Figure 9:
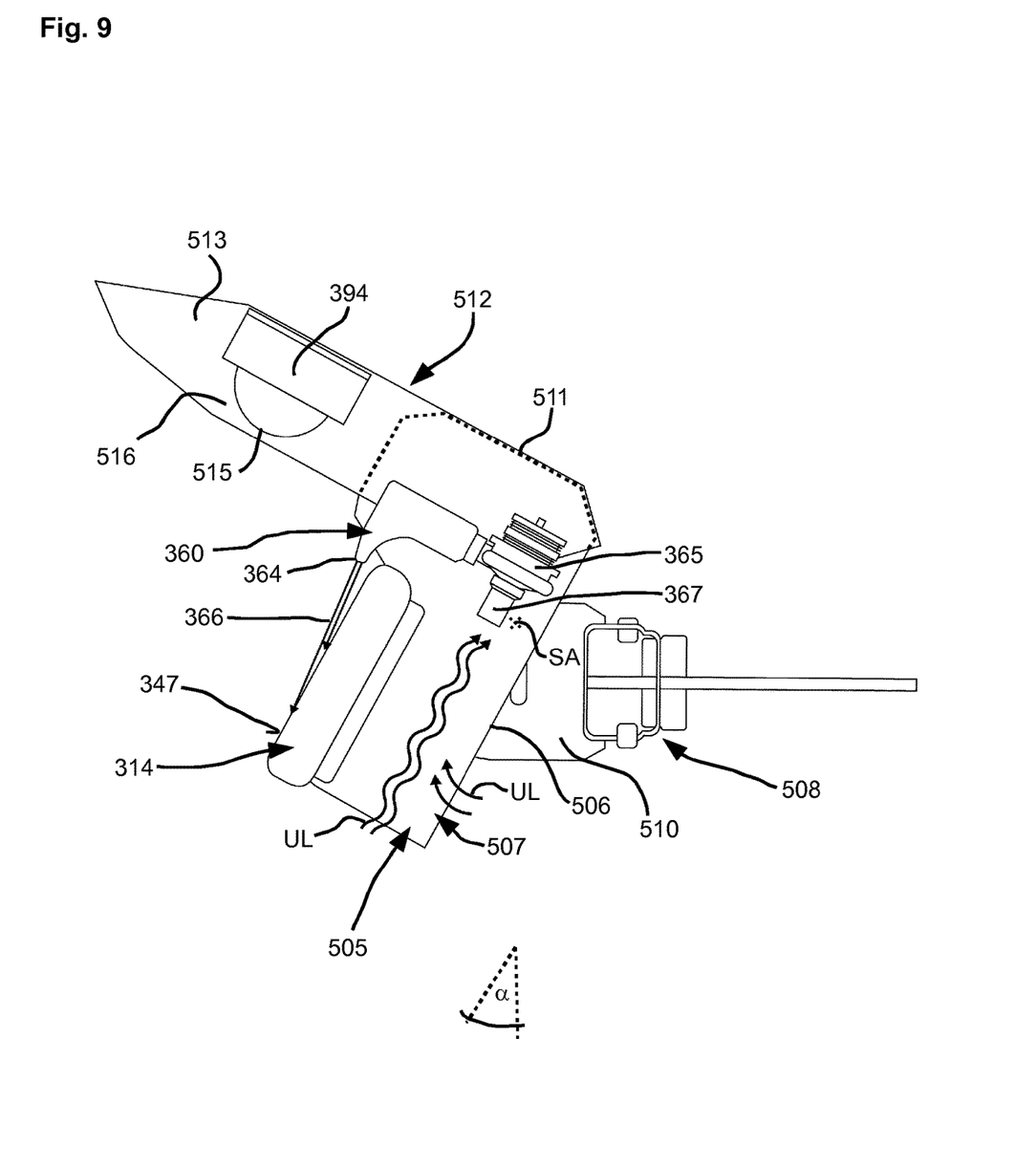
FIG. 9 shows a simplified and schematic sectional view approximately along the section line IX-IX of FIG. 8.

Furthermore, the radar unit 314 illustrated in FIGS. 8 and 9, can have an identical or similar setup as the radar unit 14 shown in FIG. 7.

The invention claimed is:

1. A radar system for sensing object movements in a predefined target area, the radar system comprising:
   at least one radar unit comprising at least one transmitting unit configured to emit electromagnetic radiation and at least one receiving unit configured to receive reflected electromagnetic radiation;
   at least one evaluating unit configured, based on the electromagnetic radiation emitted and the reflected electromagnetic radiation received and based on associated time measurements, to sense object movements in the predefined target area and to decide for a sensed object movement whether the sensed object movement is a sought-after object movement; and
   at least one covering device,
   wherein the at least transmitting unit and the at least one receiving unit are, related to a main radiation direction of the at least transmitting unit directed toward the predefined target area, arranged behind the at least one covering device or are each arranged behind a respective covering device, to protect the at least transmitting unit and the at least one receiving unit,
   wherein the at least one clearing device is provided on the at least one radar unit and configured to remove deposits which adhere to or lie on an outer surface of the at least one covering device,
   wherein the at least one evaluating unit is configured, based on the reflected electromagnetic radiation received, to determine whether deposits are present on the outer surface or not, and to decide whether the at least one clearing device becomes activated or not,
   wherein the at least one clearing device is configured as a blower device, which is configured to generate a fluid flow along the outer surface of the at least one covering device, to remove adhering or adjacent water drops or snow accumulation,
   wherein the blower device and the at least one radar unit are arranged on a common flow component, which includes at least one suction opening through which ambient air enters the common flow component and which is configured such that sucked in ambient air, after redirection by the blower device, exits as a fluid flow along the outer surface of the at least one covering device.

2. The radar system of claim 1, wherein the at least one transmitting unit and the at least one receiving unit are arranged within a radar housing, and wherein the radar housing includes at least a basis and the at least one covering device.

3. The radar system of claim 1, wherein the at least one evaluating unit is configured to determine an amplitude of the reflected electromagnetic radiation and/or determine a difference of the reflected electromagnetic radiation, which has been received by various receiving units.

4. The radar system of claim 1, wherein the blower device is arranged in an area of a first edge of the at least one covering device, wherein a main flow direction of the fluid flow is directed towards a second edge area, and wherein the second edge area lies opposite to the first edge area.

5. The radar system of claim 4, wherein the at least one radar unit is, in an assembled state, aligned in such a manner that the first edge area is located higher than the second edge area.

6. The radar system of claim 1, wherein the common flow component, related to the at least one radar unit mounted on a front side of the common flow component, includes a bottom suction opening and/or a rear suction opening.

7. The radar system of claim 1, wherein the common flow component is pivotably mountable or mounted on a support device.

8. The radar system of claim 7, wherein the common flow component is, together with the at least one radar unit and the blower device, pivotable.

9. The radar system of claim 8, wherein the common flow component is, together with the at least one radar unit and the blower device, pivotable at a pivot angle from 0° to 50°.

10. The radar system of claim 1, further comprising a protective element with a protective nose protruding beyond the at least one radar unit.

11. The radar system of claim 10, wherein an outer surface of the protective element is arranged on an upper section of the common flow component.

12. The radar system of claim 1, wherein the outer surface of the at least one covering unit has a hydrophobic coating.

13. The radar system of claim 1, further comprising at least one image taking device configured to take an image of at least one portion of the outer surface and transmit the image to the at least one evaluating unit.

14. The radar system of claim 13, wherein the at least one evaluating unit is configured to automatically evaluate an image taken and to determine whether deposits are present on the outer surface or not, and to decide whether the at least one clearing device becomes activated or not.

15. The radar system of claim 13, further comprising a protective element with a protective nose protruding beyond the at least one radar unit, wherein the at least one image taking device is mounted on an interior side of the protective element.

16. The radar system of claim 15, wherein the at least one image taking device is pivotable together with the common flow component.

17. The radar system of claim 1, wherein the at least one evaluating unit is connected to a central unit via a network, wherein the central unit is configured such that information from the at least one radar unit can be provided to an operator.

* * * * *